United States Patent
Maresca

(10) Patent No.: US 10,331,771 B2
(45) Date of Patent: *Jun. 25, 2019

(54) INTERFACING AN APPLICATION TO DATA SOURCES VIA A WEB SERVICE INTERFACE

(71) Applicant: Microsoft Technology Licensing, LLC, Redmond, WA (US)

(72) Inventor: Louis Maresca, Fargo, ND (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 853 days.

This patent is subject to a terminal disclaimer.

(21) Appl. No.: 14/199,950

(22) Filed: Mar. 6, 2014

(65) Prior Publication Data
US 2014/0189496 A1    Jul. 3, 2014

Related U.S. Application Data

(63) Continuation of application No. 12/134,914, filed on Jun. 6, 2008, now Pat. No. 8,782,065.

(51) Int. Cl.
*G06F 16/00*    (2019.01)
*G06F 17/22*    (2006.01)
(Continued)

(52) U.S. Cl.
CPC .......... *G06F 17/2247* (2013.01); *G06F 9/543* (2013.01); *G06F 16/245* (2019.01); *G06F 16/33* (2019.01)

(58) Field of Classification Search
CPC ............. G06F 17/2247; G06F 11/3082; G06F 11/3093; G06F 16/9566; G06F 16/958;
(Continued)

(56) References Cited

U.S. PATENT DOCUMENTS 7,017,112 B2    3/2006    Collie et al.
7,310,631 B2    12/2007    Kartzmark et al.
(Continued)

OTHER PUBLICATIONS

"Add an XML Web Service as a Data Source," 9 pages, Microsoft Office Sharepoint Designer 2007, http://office.microsoft.com/en-us/sharepointdesigner/HA101171541033.aspx#4 [last accessed Nov. 6, 2008].
(Continued)

*Primary Examiner* — Michelle N Owyang
(74) *Attorney, Agent, or Firm* — Mannava & Kang, P.C.

(57) ABSTRACT

A system supports discovering available web services, retrieving description documents describing the web services, and binding methods and their parameters to data of an application document. When a user wants to bind a discovered web service to an application document, the system retrieves a description document from the web service. The system then parses the description document to identify the methods supported by the web service along with their parameters. The system allows a user to map method names and parameter names to more user-friendly display names. The system allows the user to bind the parameters to data of an application document. When the document is to be updated, the system sends a request for services specifying a method and input parameters as indicated by the binding. When a response is received, the system stores output parameters of the response in the document as indicating by the binding.

6 Claims, 6 Drawing Sheets

(51) Int. Cl.
*G06F 16/33* (2019.01)
*G06F 16/245* (2019.01)
*G06F 9/54* (2006.01)

(58) Field of Classification Search
CPC ...... G06F 16/95; G06F 16/972; G06F 17/272; G06F 9/543; G06F 17/30893; G06F 17/246; G06F 17/245; G06F 17/243; G06F 17/24; G06F 17/3089
USPC .................................................. 707/600–899
See application file for complete search history.

(56) References Cited

U.S. PATENT DOCUMENTS

| | | | |
|---|---|---|---|
| 7,349,913 | B2 | 3/2008 | Clark et al. |
| 7,603,469 | B2 | 10/2009 | Fletcher et al. |
| 7,673,286 | B2 | 3/2010 | Yuknewicz et al. |
| 7,870,221 | B2 | 1/2011 | Matveief et al. |
| 7,953,102 | B2 * | 5/2011 | Fritsch et al. ............... 370/401 |
| 7,987,163 | B2 | 7/2011 | Keshavarz-Nia et al. |
| 8,316,035 | B2 | 11/2012 | Chen et al. |
| 2003/0191769 | A1 | 10/2003 | Crisan et al. |
| 2004/0044656 | A1 | 3/2004 | Cheenath |
| 2005/0125771 | A1 | 6/2005 | Vitanov et al. |
| 2005/0203892 | A1 | 9/2005 | Wesley et al. |
| 2005/0251501 | A1 | 11/2005 | Phillips et al. |
| 2006/0106748 | A1 | 5/2006 | Chafle et al. |
| 2006/0206883 | A1 | 9/2006 | Sabbouh |
| 2006/0253420 | A1 | 11/2006 | Hinton et al. |
| 2007/0006144 | A1 | 1/2007 | Tsai et al. |
| 2007/0118844 | A1 | 5/2007 | Huang et al. |
| 2007/0174439 | A1 | 7/2007 | Ansari |
| 2008/0120607 | A1 | 5/2008 | Dippel |
| 2008/0134089 | A1 | 6/2008 | Adachi et al. |
| 2008/0222507 | A1 | 9/2008 | Nguyen et al. |
| 2009/0172553 | A1 | 7/2009 | Sikka et al. |
| 2009/0307190 | A1 | 12/2009 | Maresca |
| 2011/0276396 | A1 | 11/2011 | Rathod |

OTHER PUBLICATIONS

Allen, Richard, "Interoperability and Web-Services," Oxford Computer Consultants Impact Newsletter, Issue 1, Jan. 19, 2006, 6 pages, http://www.oxfordcc.co.uk/newsletters/001/interoperability.html [last accessed Nov. 6, 2008].

Caron, Rob et al., "Data Interoperability Using Enterprise-Wide Data Sources," Microsoft Corporation, Aug. 1999, 13 pages, http://msdn2.microsoft.com/en-us/library/ms811449.aspx [last accessed Nov. 6, 2008].

Wang, Feng et al., "Spatial Data Sharing and Interoperability Based on Web Spatial Data Service and GML" ISPRS Workshop on Updating Geo-spatial Databases with Imagery & The 5th ISPRS Workshop on DMGISs, pp. 247-251, http://www.commission4.isprs.org/urumchi/papers/247-251%20Feng%20Wang.pdf [last accessed Nov. 6, 2008].

* cited by examiner

INTERFACING AN APPLICATION TO DATA SOURCES VIA A WEB SERVICE INTERFACE

CROSS REFERENCE TO RELATED APPLICATION

This application is a continuation application of U.S. patent application Ser. No. 12/134,914, filed on Jun. 4, 2008, and entitled "INTERFACING AN APPLICATION TO DATA SOURCES VIA A WEB SERVICE INTERFACE," which is incorporated herein in its entirety by reference.

BACKGROUND

Productivity applications, such as Microsoft's OFFICE suite (which includes WORD and EXCEL), support interfaces with multiple reporting data sources. These data sources may include Object Linking and Embedding ("OLE") data sources and Open Database Connectivity ("ODBC") data sources. Such a productivity application may provide a user interface wizard through which a user can define a data source, specify a source location of the data source, and specify a target location for the data within a document of the application. For example, if the data source is a database, the data source may be defined by the network address of the database server and the source location may be specified by table name, row identifier, and field name (e.g., table name is "customer," row identifier is "company name is Microsoft," and field name is "stock quote"). If the application is a spreadsheet application, then the target location may be specified by column and row number (e.g., B10). When a user has the document loaded by the application, then the application may either automatically or upon user request update the document with data from the data source. In this example, such updating would retrieve the current stock quote for Microsoft and insert it in cell B10 of the spreadsheet.

Users of such productivity applications, however, are limited by the types of data sources that the developers of the applications are willing to support. There are currently many different types of data sources. Since the developers need to program the applications specifically to support each type of data source, it can be very expensive for a developer to support many types of data sources. Also, new types of data sources are being continually introduced. As such, even if a developer wants to support a new type of data source, there may be a considerable lag between when the data source is available and when the developer can release a version of the application that supports the new data source.

SUMMARY

A data source interface system supports discovering available web services, retrieving description documents describing the web services, and binding methods and their parameters to data of an application document. Web services may register their availability with a discovery service. The data source interface system queries available discovery services to identify available web services. When a user wants to bind a service of an available web service to an application document, the data source interface system retrieves a description document from the web services. The data source interface system then parses the description document to identify the methods supported by the web service along with their parameters. The data source interface system allows a user to map method names and parameter names to more user-friendly display names. The data source interface system uses these display names when presenting its user interface. The data source interface system allows the user to bind the parameters to data of an application document. When the document is to be updated, the data source interface system sends a request for services specifying a method and input parameters as indicated by the binding. When a response is received, the data source interface system stores output parameters of the response in the document as indicating by the binding.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
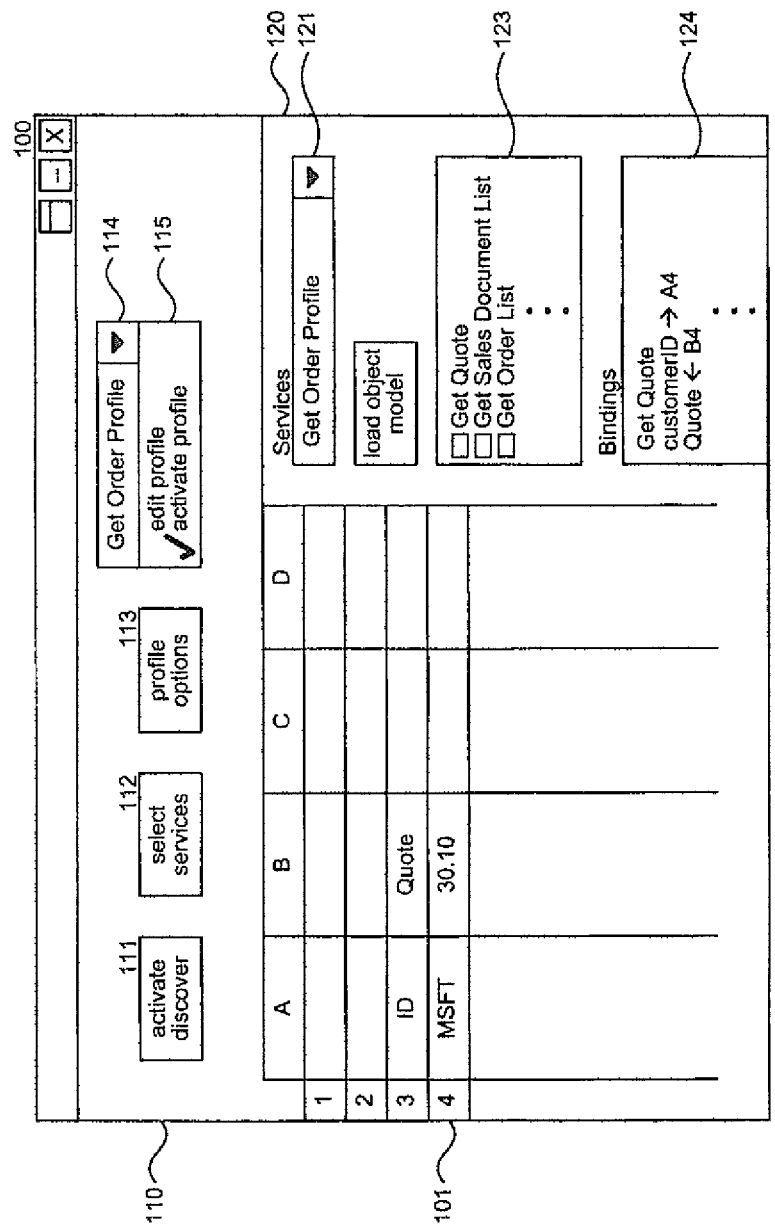
FIG. 1 illustrates a display page showing the data source interface system user interface integrated with the user interface of an application in some embodiments.

A method and system for providing a data source interface of an application through which a variety of types of data sources can be accessed is provided. In some embodiments, a data source interface system is implemented as an add-in component to an application that connects to data sources that support a web service interface. A web service interface is defined by a submission to the World Wide Web Consortium ("W3C") that includes a Web Services Description Language ("WSDL") specification. WSDL is an eXtensible Markup Language ("XML") format for describing network services as a set of endpoints operating on messages containing either document-oriented or procedure-oriented information. The operations and messages are described abstractly and then bound to a concrete network protocol and message format to define an endpoint. Related concrete endpoints are combined into abstract endpoints, referred to as services. WSDL is typically used in conjunction with the SOAP 1.1, HTTP GET/POST, and MIME protocols. A description document or WSDL document describes services as methods with input and output parameters. For each service supported by a web service endpoint or server, the WSDL document specifies the name of the method and the name of each parameter. The WSDL document also specifies the type of each parameter (e.g., integer, string, or complex type) and whether it is an input parameter or an output parameter. To request a service, a request message specifying a method name and values of input parameters is sent from an application to the web service server. In response, the application receives a response message from the web service server that includes the output parameters. Because different types of data sources can be adapted to support a web service interface, a data source interface system of an application that supports a web service interface effectively supports a broad range of data source types.

In some embodiments, the data source interface system supports discovering available web services, retrieving WSDL documents describing the web services, and binding methods and their parameters to data of an application document. Web service servers may register their availability with a Universal Description, Discovery, and Integration ("UDDI") server. The UDDI server implements a protocol for such registration and subsequent discovery by applications. The data source interface system queries available UDDI servers to identify available web service servers. The data source interface system may also allow a user to specify a web service server using its network address. When a user wants to bind a method of an available web service server to an application document, the data source interface system retrieves the WSDL document from the web service server. The data source interface system then parses each WSDL document to identify the methods supported by the web service server along with their parameters. Because the method names and parameter names specified in a WSDL document may not be particularly user-friendly, the data source interface system allows a user to map method names and parameter names to more user-friendly display names. For example, a user may want to map the method name of "cust-table-1" to the display name of "Main Customer Table." The data source interface system uses these display names when presenting its user interface. The data source interface system, however, uses the name specified in the WSDL document when communicating with the web service server.

The data source interface system allows a user to bind the input and output parameters of a method to the data of the application. (In the following, the data source interface system is described in the context of a spreadsheet application. One skilled in the art, however, will appreciate that the data source interface system may be used with the data of any type of application, such as a word processing application, a presentation application, a publishing application, and so on.) For example, for the method name "Get Customer Quote," a user may bind the input parameter named "Customer ID" to cell B10 of the spreadsheet and may bind the output parameter named "Stock Quote" to cell B11 of the spreadsheet. The data service interface system can then send a request message to the web service server with the "Customer ID" retrieved from cell B10 and, when the response message is received, store the "Stock Quote" in cell B11. The data source interface system stores an indication of the web services, their display name mappings, and their bindings as a profile document that can optionally be included as part of the application document itself (e.g., as a property). When the profile is included as part of the application document, the application document can be sent to another user who can use the data source interface system to update the data of the application document based on the attached profile.

In some embodiments, the data source interface system parses a WSDL document using conventional techniques for traversing the hierarchical structure of the WSDL document. The result of the traversal is referred to as an "object model" that describes each method, its parameters, and the simple and complex types of the parameters. Because a WSDL document may describe many more methods than are actually bound to data in an application document, the data source interface system stores information relating to only those bound methods in a profile. Because the profile also includes an identifier of the web service server, the data source interface system can re-retrieve the WSDL document from the web service server as appropriate. Thus, a user can later select other methods to bind to the data of the application document.

In some embodiments, the data source interface system displays to a user names of methods and parameters as specified by the WSDL document. A user can then provide a display name for any of the names that is more user-friendly than the name specified in the WSDL document. Once the mapping to display names is specified, the data source interface system uses the display names for its user interface. The data source interface system also stores the mapping as part of the profile so that when the profile is subsequently accessed, the display names can be used.

FIG. 1 illustrates a display page showing the data source interface system user interface integrated with the user interface of an application in some embodiments. A display page 100 includes an application data area 101, a web service interface menu area 110, and a web service interface binding area 120. In this example, the application is a spreadsheet. The web service interface menu area includes an activate discovery button 111, a select services button 112, a profile options button 113, a profile drop-down list 114, and action options 115. When a user selects the activate discovery button, the data source interface system accesses available UDDI servers to identify registered web service servers that are available to the application. The data source interface system also allows a user to specify a specific web service server. A user selects the select services button to provide identification information for a specific web service server. Once the web service servers have been discovered or specified, a user selects the profile options button to specify mappings between names of methods and parameters of the WSDL documents for the web service servers to their corresponding display names. A user uses the profile drop-down list to select a profile to be activated for the currently open document. The user uses the action options to edit the selected profile or to activate the selected profile. The web service interface binding area includes a web services drop-down list 121, a load object model button 122, a methods list 123, and a bindings area 124. The web services drop-down list is used to select one of the web services of the currently activated profile. A profile may specify many different web services. When the user selects the load object model button, the data source interface system retrieves the WSDL document for the selected web service and generates its object model and populates the methods list with the display names of the methods. When a user selects a method of the methods list, the data source interface system displays any binding information in the bindings area. If a method is selected that has already been bound, then the web services interface system displays an indication of that binding in the bindings area. In this example, the method "Get Quote" is already bound and its input parameter "Customer ID" is bound to cell A4 and its output parameter "Quote" is bound to cell B4. The data source interface system allows the user to change the bindings for already bound methods or to bind methods that have not already been bound.

Figure 2:
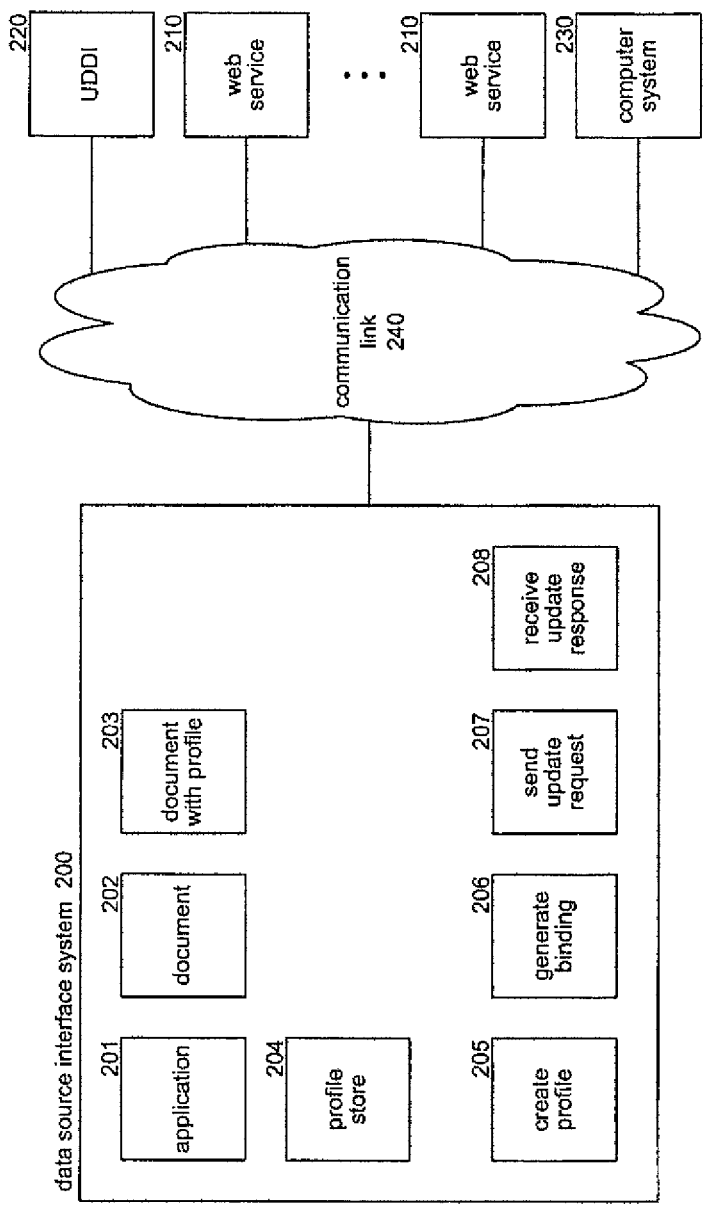
FIG. 2 is a block diagram that illustrates components of the data source interface system in some embodiments.

FIG. 2 is a block diagram that illustrates components of the data source interface system in some embodiments. The data source interface system 200 may be implemented on a computer system as an add-in to an application program 201 or a suite of application programs. The web service information system may include a create profile component 205, a generate binding component 206, a send update request component 207, and a receive update response component 208. The create profile component allows the user to create a profile by specifying web services, mappings to display names, and bindings. The create profile component may store the profiles in a profile store 204. The create profile component may invoke the generate binding component to generate the bindings of the methods. The data source interface system invokes the send update request component to send a request message to the web service servers specified in an activated profile. The data source interface system invokes the receive update response component when a response message is received from a web service server and updates the data of the application as appropriate. The application may store the data of the application in an application document 202. The data source interface system may also allow a user to append a profile to an application document 203. When a profile is appended to an application document, the document can be sent into other computer systems that can use the data source interface system installed at their computer system to update the data of the application in accordance with the attached profile. A computer system on which the data source interface system is implemented may communicate with various web service servers 210, UDDI servers 220, and computer systems 230 via a communications link 240.

The computing device on which the data source interface system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the data source interface system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the data source interface system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The data source interface system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
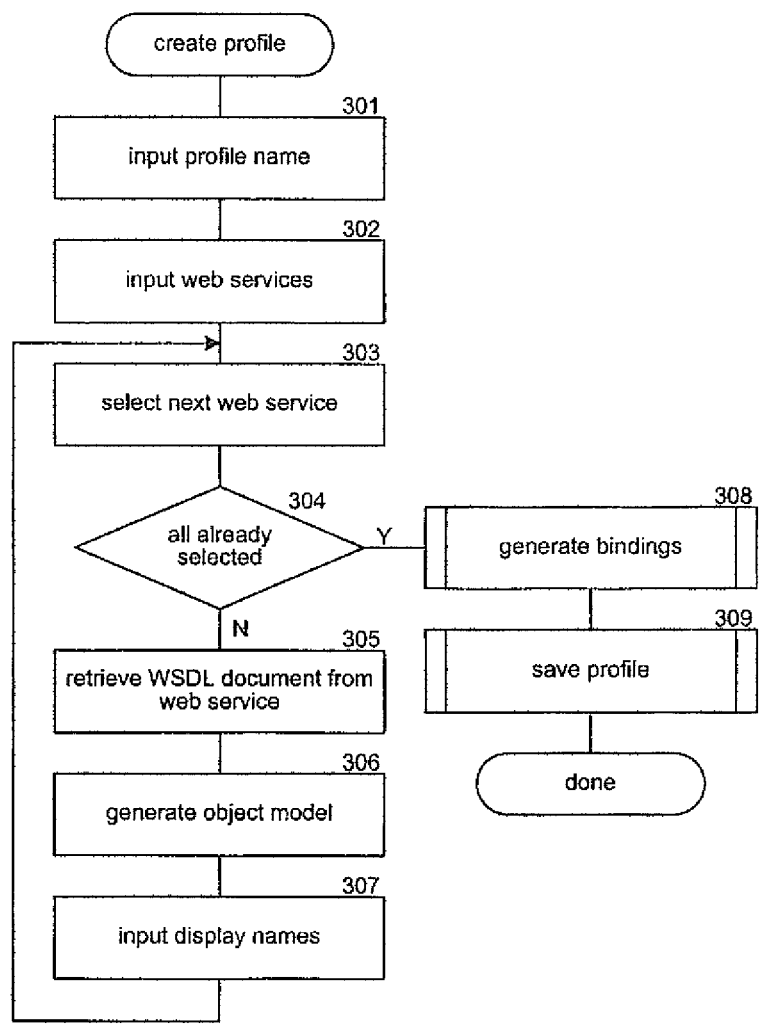
FIG. 3 is a flow diagram that illustrates the processing of the create profile component of the data source interface system in some embodiments.

FIG. 3 is a flow diagram that illustrates the processing of the create profile component of the data source interface system in some embodiments. The create profile component allows the user to select web service servers for the profile, specify display names, and bind the methods of the profiles to data of the application. In block 301, the component inputs a profile name from the user. In block 302, the component inputs an indication of which available web service servers are to be included in the profile. The available web service servers may have been identified via a discovery process or specified by the user. In blocks 303-307, the component loops selecting web service servers and allowing the user to specify display names. In block 303, the component selects the next web service server that is part of the profile. In decision block 304, if all such web service servers have already been selected, then the component continues at block 308, else the component continues at block 305. In block 305, the component retrieves the WSDL document from the web service server. In block 306, the component generates the object model from the WSDL document. In block 307, the component inputs display names for methods and parameters of the object model and then loops to block 303 to select the next web service server. In block 308, the component invokes the generate binding component to generate the bindings for methods to be included in the profile. The component may invoke the generate binding component for each web service server of the profile. In block 309, the component saves the profile in the profile store and then completes.

Figure 4:
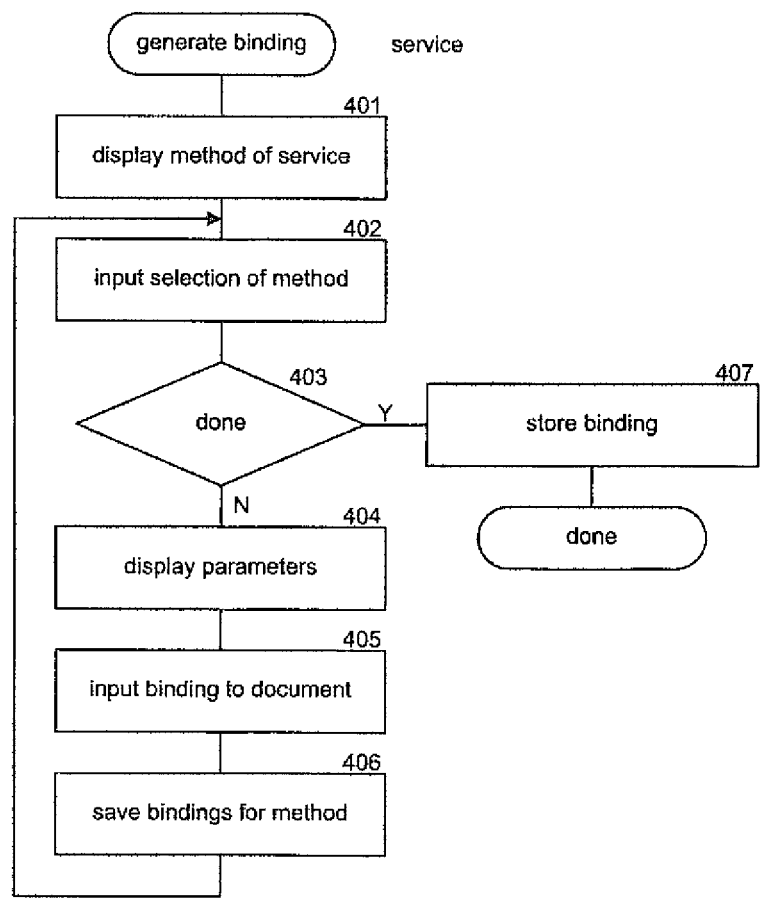
FIG. 4 is a flow diagram that illustrates the processing of the generate binding component of the data source interface system in some embodiments.

FIG. 4 is a flow diagram that illustrates the processing of the generate binding component of the data source interface system in some embodiments. The component may be passed an indication of a web service server and allows the user to specify bindings. In block 401, the component displays the methods of the web service server to the user. In blocks 402-406, the component loops allowing the user to select different methods of the web service server. In block 402, the component inputs a selection of a method from the user. In decision block 403, if the user is done with the bindings, then the component continues at block 407, else the component continues at block 404. In block 404, the component displays information describing the parameters of the selected method. In block 405, the component inputs the bindings for each parameter to data of the application document. The component may also verify that the types of the bound data are compatible. For example, a parameter of type integer would not be compatible with a data value of "MSFT." The data source interface system may also check type compatibility each time the data of the application is updated based on the profile. In block 406, the component saves the bindings for the method and then loops to block 402 to allow the user to select another method. In block 407, the component stores the bindings for the methods of the web service server in the profile and then completes.

Figure 5:
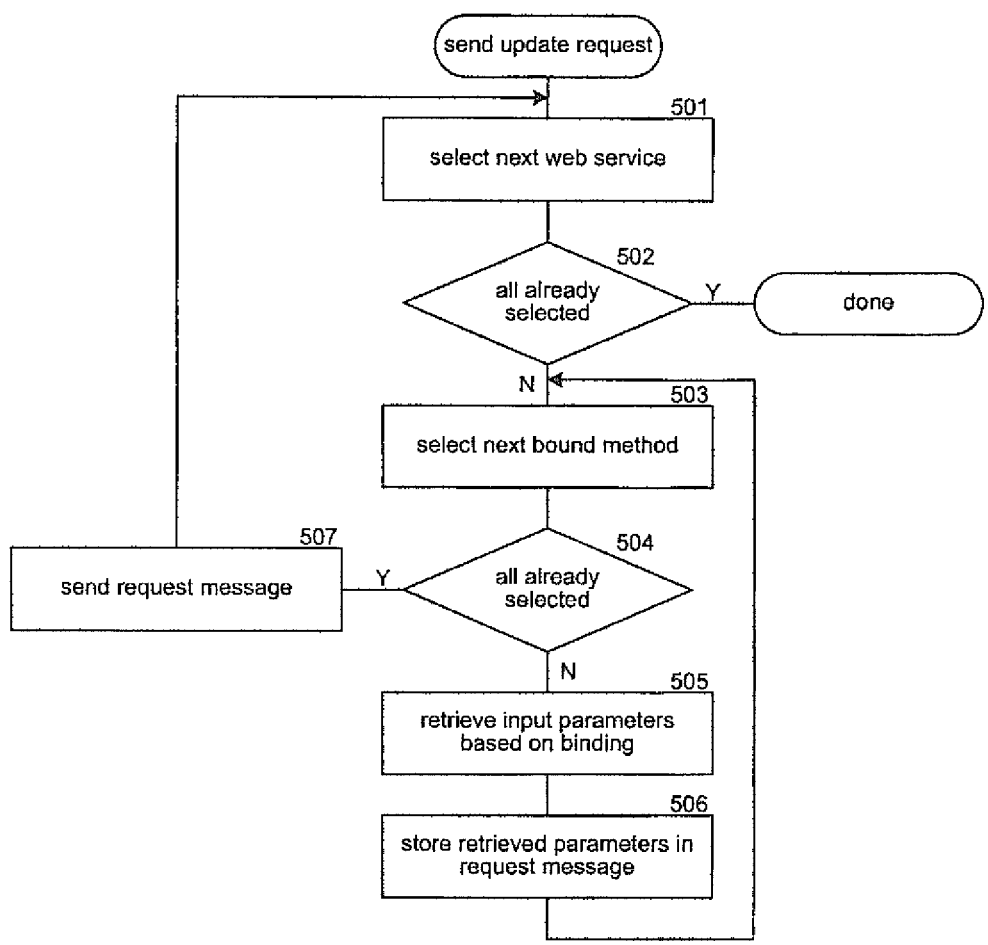
FIG. 5 is a flow diagram that illustrates the processing of the send update request component of the data source interface system in some embodiments.

FIG. 5 is a flow diagram that illustrates the processing of the send update request component of the data source interface system in some embodiments. The component is invoked whenever the data of the application is to be updated in accordance with the activated profile. In blocks 501-507, the component loops selecting each web service server of the profile and sending a request message to the selected web service server. In block 501, the component selects the next web service server. In decision block 502, if all the web service servers have already been selected, then the component completes, else the component continues at block 503. In blocks 503-506, the component loops selecting each bound method of the selected web service server. In block 503, the component selects the next bound method. In decision block 504, if all the bound methods have already been selected, then the component continues at block 507, else the component continues at block 505. In block 505, the component retrieves the input parameters from the data of the document based on the binding of the method. At this point, the component may validate that the type of the retrieved data is compatible with the type of the parameter.

In block 506, the component stores the retrieved parameters in a request message and then loops to block 503 to select the next bound method. In block 507, the component sends the request message to the selected web service and then loops to block 501 to select the next web service server.

Figure 6:
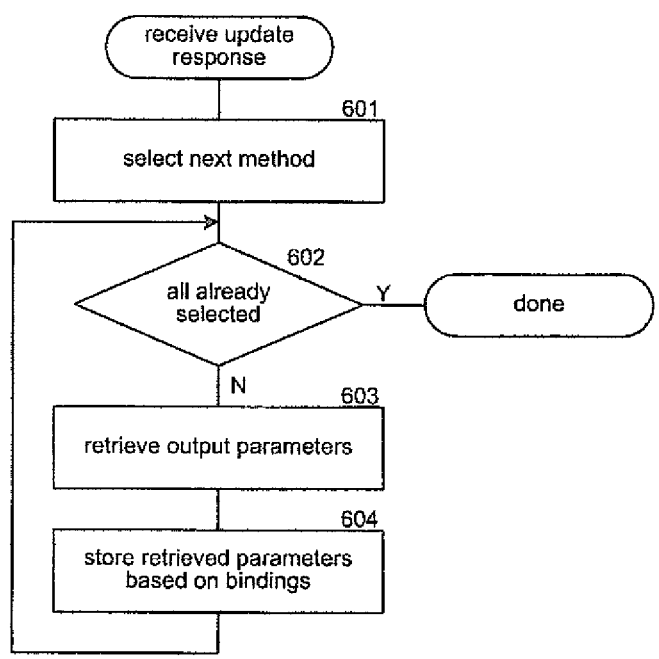
FIG. 6 is a flow diagram that illustrates the processing of the receive update response component of the data source interface system in some embodiments.

FIG. 6 is a flow diagram that illustrates the processing of the receive update response component of the data source interface system in some embodiments. The component is invoked when a response to a request message is received. In block 601, the component selects the next method of the response message. In decision block 602, if all the methods have already been selected, then the component completes, else the component continues at block 603. In block 603, the component retrieves the output parameter for the selected method. In block 604, the component stores the retrieved parameters based on the bindings of the profile and then loops to block 601 to select the next method.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, although the data source interface system is described in terms of updating an application, the data source interface system can be used to take data from the application and update a data source. Accordingly, the invention is not limited except as by the appended claims.

I claim:

1. A non-transitory computer-readable medium containing computer-executable instructions for controlling a computing device to add a web service as a data source to an application, by a method comprising:
    identifying, from a universal description, discovery, and integration server, one or more web services provided by servers that are available, wherein each web service is registered with the universal description, discovery, and integration server by an available server that provides the web service;
    sending to an available web service a request for a web service description language (WSDL) document describing services provided by the available web service;
    after receiving a WSDL document from the available web service:
        identifying, from the WSDL document, methods and parameters of the methods that implement services of the available web service;
        receiving a mapping of original names of methods and parameters to display names of methods and parameters;
        receiving a selection of methods from the display names and a specification of bindings of input and output parameters of the methods to data of the application contained in a data document;
        storing an indication of the available web service, the received mapping of names, and the selected methods and the specified bindings as a web service profile; and
        storing the web service profile as part of the data document such that the data document contains both the data of the application and the web service profile; and
    updating data of the application based on the web service profile by:
        sending a request to the available web service, wherein the request includes for a selected method a value of an input parameter retrieved from the data of the application as indicated by the specified bindings for the selected method;
        receiving a response from the available web service, wherein the response includes a value of an output parameter for the selected method; and
        storing the received values of the output parameters as data of the application contained in the data document as indicated by the specified bindings.

2. The non-transitory computer-readable medium of claim 1 wherein the data document with the web service profile is sent to another computing device at which the web service profile is used for updating data of the data document.

3. The non-transitory computer-readable medium of claim 1 wherein the web service profile contains bindings for multiple web services.

4. The non-transitory computer-readable medium of claim 1 wherein a user is provided an option of adding the web service profile to the data document.

5. The non-transitory computer-readable medium of claim 1 wherein the non-transitory computer-readable medium is a memory.

6. A non-transitory computer-readable memory storing computer-executable instructions for controlling a computing device to add a data source for an application, the computer-readable instructions comprising instructions that:
    generate a data document of the application, wherein the data document contains data items that are data of the application;
    select an available web service registered with a web service registration server;
    send to the selected web service a request for a definition document describing services provided by the selected web service, wherein the definition document describes methods and parameters of the methods to be used when requesting a service;
    upon receiving the definition document, process the definition document to identify the methods and parameters of the methods;
    receive, from a user, a mapping of original names of methods and parameters as specified in the definition document to display names for use in displaying to a user;
    receive a selection of methods of the definition document from the display names and a specification of bindings of input and output parameters of the selected methods to data items contained in the data document;
    send a request to the selected web service, wherein in the request includes values of input parameters retrieved from data items contained in the data document as indicated by the specified bindings for the selected methods;
    receive a response from the selected web service, wherein the response includes values of output parameters for the selected methods;
    store the received values of output parameters as data items contained in the data document as indicated by the specified bindings;
    store the mapping and the specified bindings as a profile;
    store the profile as a property of the data document, wherein the profile is included as part of the data document containing data items of the application; and
    send to another user the data document that contains the data items and the profile;

wherein after the data document is received by the other user, the other user updates the data items contained in the data document based on the profile that is stored as a property of the data document.

* * * * *